9494 X
H. Hartge,
Piano;
Patented Mar. 12, 1836.
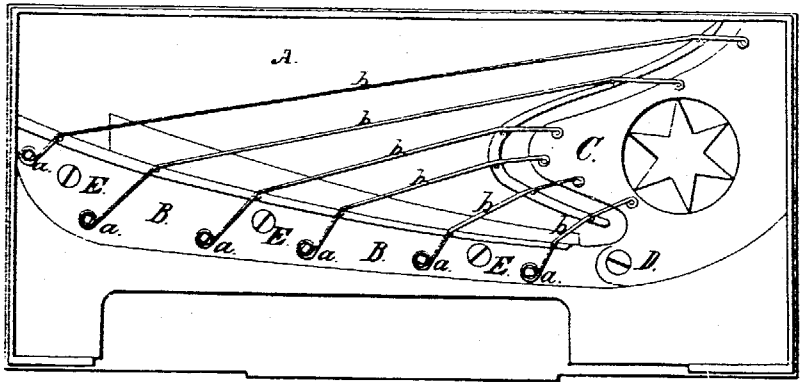

Mar 12. 1836 No. 14 217

X9494

Henry Hartge Baltimore Md
Letters Patent

The schedule referred to in these Letters Patent and making part of the same contain -ing a description in the words of the said Henry Hartge himself of his improvement in the Construction of Piano Fortes.

To all to whom these presents shall come, Be it known that I Henry Hartge of the City of Baltimore in the State of Maryland have invented a new and useful Improvement in the Construction of Piano Fortes and that the following is a full and exact description of the construction of the said improvement as invented by me. In the ordinary mode of Constructing Piano Fortes the tuning pins or tuning [illegible] which the tension of the strings is increased or diminished as may be required to put the instrument in tune are inserted into a solid block or [illegible] of wood in the proper places so tightly that the friction or adhesion of the metal [illegible] -ning pin to the wooden tuning block, as it is technically termed, is suf -ficient to prevent the tuning pin from being turned by the tension of the string which is kept strained by it. The wood however being softer than the tuning pin and elastic in itself it often happens that the pin is without being turned drawn by the tension of the string out of its perpendicular position after the Piano has been tuned whereby the tension of the string being diminished the instrument be -comes as it is called out of tune. This is the more liable to be the case the higher the key or pitch to which the Piano is tuned. Defects in the solidity of the tu -ning block may render this inclination or giving way of the tuning pins different in different parts of the same Piano. The pins in the ordinary mode of Construction may even remain perpendicular in their proper position and the instrument nevertheless become out of tune by the whole tuning block itself yielding to the tension of the strings. It is for the purpose of obviating these dif -ficulties so far as it can be done by keeping the tuning pins firm and the tuning block in its proper position that my improvement is made, and I effect these objects in the following modes. I propose a metallic plate of the length of the tuning block and of a sufficient width to [illegible] [illegible]

218. X9494 secured fast to the tuning block (the tension of the strings) with circular holes
exactly corresponding with the holes for the tuning pins in the tuning block
The holes in the metallic plate are just large enough to permit the tuning
pins turning round smoothly with the least play between the pin and
the metallic plate. The tuning pins are prevented from turning round
(by the tension of the string) in this case as in any other by the friction
against the wood of the tuning block. And by means of the metallic
plate they are prevented from being drawn out of their perpendicular position
and the tuning block is made firm enough to resist the accumulated
tension of all the strings which keep the metallic plate just described
constitutes the improvement which I have invented. In the pianos which
I have made with a view of testing the utility of my invention the thick
-ness of the metallic plate has been about three eights of an inch which I
have found to answer well though it may be made in different ~~different~~
x dimensions in this respect and still produce the same effect. It may
also be made of brass iron or other metal. I have hitherto used iron. The
metallic plate here described is screwed fast to the tuning block and is connec
-ted by a screw or other sufficient fastening to the metallic plate which is
above the sounding board and upon which the strings are hung or fasten
-ed immoveably. In the accompanying drawing but one construction of
piano is shown. My improvement is equally applicable to any other
What I claim as new and as my own invention in the above and for the
use of which I ask an exclusive privilege is the metallic plate fastened
to the tuning block with holes for the tuning pins to pass through furnishing
additional security and permanency to such pins and giving increased
firmness to the tuning block, thereby aiding to keep the instrument in tune Witnesses
Jno H B Latrobe
F. Anderson Henry Hodge 784 [illegible]

[illegible]
[illegible]

(Drawings have been made)

Drawing